UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

PHENOLIC CONDENSATION PRODUCT AND PROCESS OF MANUFACTURING.

1,339,134.  Specification of Letters Patent.  Patented May 4, 1920.

No Drawing.  Application filed June 6, 1918. Serial No. 238,479.

*To all whom it may concern:*

Be it known that we, LAWRENCE V. REDMAN, a citizen of Canada, (who has taken out his first papers for citizenship in the United States,) residing at Evanston, Cook county, Ill., and ARCHIE J. WEITH and FRANK P. BROCK, citizens of the United States, residing at Chicago, in the county of Cook and State of Illinois, have invented a new and useful Improvement in Phenolic Condensation Products and Processes of Manufacturing, of which the following is a specification.

This invention relates particularly to the production of phenolic condensation products and especially molded products.

As is known, a phenolic condensation product is produced by combining a phenolic body, such as phenol or its homologues, with an active methylene substance, such as hexamethylenetetramin or formaldehyde, containing the methylene radical.

It is well known that a phenolic condensation product (usually having a filler introduced therein) may be molded in hot presses and discharged hot or cold, as desired. It has been proposed, also, to mix a phenolic condensation product with a filler and mold the same in the regular manner of cold-molded products, the final hardening being effected by subjecting the molded article to the action of heat after its removal from the mold. In a prior art patent, it is proposed to prepare an initial product of phenol and formaldehyde (the latter in decided excess); arrest the reaction when a soluble resin of sp. gr. from 1.15 to 1.21 has been produced; mix this binder with a filler; and then mold the mixture and harden by heat treatment. This calls for a reaction in the molded product in which water is formed as a by-product and must be eliminated by heat, tending to the production of a spongy and otherwise inferior product. Moreover, difficulty has been experienced in securing resins of proper consistency to permit the mass to be properly kneaded and afterward properly molded by a cold-molding process. This is due partly to the volatile nature of formaldehyde, and the difficulty of determining the loss of methylene. It has been proposed, also, to use such solvents as alcohol, acetone, etc., in an effort to secure the proper consistency and the proper coherency in the molding operation, but this involves additional expense for materials not useful in the product and is otherwise objectionable, and especially so because of the difficulty of securing the resin in a stage of reaction at which it is best adapted for the purpose.

Another very serious objection to the process described in the above-mentioned patent is that a phenol-formaldehyde resin having a specific gravity within the limits mentioned in said patent corresponds with a reaction product between phenol and formaldehyde, taken in the proportion stated in the patent, which is about two-thirds (or more) complete; that is to say, the lowest limit (sp. gr. 1.15) mentioned in the patent corresponds with a phenol formaldehyde resin in which about 65% of the phenolic body has combined with the formaldehyde, while the upper limit (sp. gr. 1.21) corresponds with such a resin having about 80% of the phenolic body combined with the formaldehyde. This means that the reaction has proceeded too far to permit of proper welding of the particles in a quick-molding process, assuming that a proper admixture of the binder with a filler could be secured, which would be difficult, if not impossible. The desirability of eliminating water formed as a by-product (as well as water of solution) leads to this difficulty. The result is an almost worthless product having very low tensile strength, a low dielectric constant, and high water-absorptive qualities.

So far as we are aware, no method of cold-molding phenolic condensation products has proven practicable, or found its way into practical use. Our primary object is to provide a thoroughly practicable method whereby phenolic condensation products may be subjected to a short molding operation at ordinary or room temperatures, and subsequently hardened by heat treatment after removal from the molds. By such a method, the output of the molds may be increased from 50 to 75 fold; and, as will be immediately appreciated, this results in an enormous saving in the cost of molds, the cost of presses, the cost of labor, and in the cost of production, generally.

The difficulties indicated above may be obviated, and excellent molded compounds comprising or containing a phenolic condensation product may be produced by the improved process herein described.

The improved process, in a preferred example, may be described as follows: A suitable filler, either an organic filler or an inorganic filler, such as wood flour or asbestos pulp or fiber, or a combination of an organic and an inorganic filler, if desired, is moistened with a solution of hexamethylenetetramin in a fresh unreacted phenolic body, such as cresol; and afterward there is added a potentially reactive phenolic condensation product, preferably in pulverulent form, anhydrous in character and capable of anhydrous reaction, which is thoroughly mixed with the moistened filler, thus producing a suitable molding composition. The hexamethylenetetramin, the cresol, and the potentially reactive phenolic condensation product constitute a binder which is capable of being hardened by heat treatment into a hard resistant and substantially infusible and insoluble condensation product.

The mixture of the filler and binder is introduced into a mold and subjected to a heavy molding pressure at ordinary or room temperature, or at any desired temperature. This pressure is desirably from three to five tons per square inch, and the molding operation requires but an instant. The molded article is then removed from the mold and subjected to heat treatment for a sufficient period of time to convert the molded article to a hard resistant body, the binder becoming, in this step of the treatment, practically infusible and insoluble when the heat treatment is sufficiently long continued.

The heat treatment is preferably continued for a period of several hours, usually from two to twenty hours, depending upon conditions, including the size of the molded article, etc. Also, the heat treatment is preferably graduated, starting with a temperature approximating room temperatures, and being elevated either continuously or from time to time until a temperature of say 160° C. to 200° C. is reached, after which the treatment may be continued at such temperature for several hours. Care should be exercised to prevent the application of too much heat immediately after the molded article is introduced into the kiln. The molding composition is such as to enable the molded article to properly retain its form, but the quick application of too much heat may result in an imperfect article. The object which is to be attained in this respect is to so gradually expel solvents (where present) and ammonia during the first portion of the heat treatment as to harden the molded body and cause it to require such tenacity as to enable the article to retain its form and avoid blistering. With the exercise of moderate care, this may be readily accomplished; and after the body has gained a desired tenacity in the preliminary heat treatment, the temperature may be raised quite rapidly until the maximum desired temperature is reached, after which the treatment may be continued until the chemical reaction is complete.

The ratio of the filler to the binder may vary within wide limits. Usually it is desirable to employ a large excess by weight of filler. We have made products containing as low as 7% by weight of phenol resins, and, on the other hand, we have made products containing as high as 60% by weight of phenol resins. A very satisfactory product is produced by employing the materials in the proportion of 30% binder and 70% asbestos filler, for illustration.

More specifically describing the preferred method, take 50 pounds of cresol dissolved with 13 pounds of hexamethylenetetramin and mix the same with 600 pounds of asbestos pulp and 150 pounds of asbestos fiber, preferably about one-half inch in length. Mix these together in any suitable machine, such as a kneading machine, preferably at about room temperature. After such mixing operation, add 300 pounds of a fusible condensation product of phenol and hexamethylenetetramin, preferably pulverulent, such condensation product preferably containing therein both free phenol and free hexamethylenetetramin. Mix these materials intimately in the kneading machine, thus producing a molding compound which is suitable for introduction into the molds. In the proportions given, the molding compound will be found to be of a consistency suitable for molding, will flow properly in the molds, and will possess sufficient coherency to enable the material to be properly compacted in the molds and to retain the shape imparted by the molds. Should the molding compound be found to be too dry, suitable solvents may be added, though generally not necessary; and should the molding material be found to be too wet or sticky, it may be brought to the desired consistency by gentle heating.

Where solvents are used, any of the usual solvents for soluble phenolic condensation products may be employed, such as alcohol, acetone, or a mixture of solvents. If desired, some water may be used in the solvent or mixture of solvents. In any case, the whole mass, before introduction into the molds, is kneaded until it has become a homogeneous plastic. It is then pressed in the molds, which either may be hot or cold, or of moderate temperature. The molding operation, in any case, may be performed in an instant, enabling the molded piece to be at once discharged from the mold. It is then placed in an oven or kiln and heated at temperatures ranging say from 100° C.

to 160° C. or higher. At the outset of the heat treatment, it is preferred to apply the heat with moderation until the molded article acquires such tenacity as to resist blistering or deformation of form. The molded article preferably is kept at a higher temperature noted for a period of several hours, or until the chemical reaction has proceeded to a point which will give the maximum desired qualities. Assuming the phenolic body and methylene body to be used in the proper proportions (corresponding with approximately one methylene group to each phenolic group) the phenolic condensation product, at the end of the heat treatment, will be practically infusible and insoluble.

It has been observed that where a warmed or moderately heated mold is employed, say a mold having a temperature of 90° C. to 120° C., a better surface is attained in a rapid molding process than is attained when a cold mold is employed. The molds may be of any desired temperature, however, which will not interfere with the rapid operation; and in any case the main chemical reaction which must occur to complete the transformation of the binder to the hard infusible state may be performed after the removal of the molded article from the mold. This enables vast economy to be effected in the production of molded articles comprising or containing a phenolic condensation product. If desired, the stock may be warmed preparatory to the molding operation.

Where it is desired to produce a flameproof molded article, one may employ 30% by weight of binder and 70% by weight (or more) of asbestos filler. We have succeeded in producing such a flame-proof product, and our invention in this respect meets a long-felt want. A flame-proof product requires in excess of sixty per cent. by weight of inorganic filler.

The fusible phenolic condensation product which we prefer to employ as a part of the binder in the manner described above is preferably produced as follows:

Mix 1080 pounds of cresol ($2CH_3C_6H_4OH$) and 140 pounds of hexamethylenetetramin ($(CH_2)_6N_4$); heat the mixture in a vessel or still, while stirring, to a temperature of 140° C.; then turn off the heat and allow the evolution of ammonia to proceed (the temperature automatically rising); apply further heat after the rapid evolution of ammonia ceases, continuing the heat at a temperature of preferably 165° C. for twelve to twenty-four hours; then raise the temperature gradually through a period of from four to seven hours, reaching a temperature of about 215° C. and then discontinue the heat; then eliminate or drive off a portion of the free cresol, perhaps ten per cent. or more of the original amount, by blowing hot air through the fusible mass while in liquid condition, leaving a resin which corresponds with about 1½ phenol groups to each methylene group; then pour into or mix with the blown mass 78 pounds of creosote oil, and also pigments or coloring matter, if desired; pour the mass into a mixer, such as a paint-mixer, the mass being now at a temperature of from 85° C. to 125° C. and having the consistency of a stiff liquid or taffy; add to, or stir into the mass 120 pounds of hexamethylenetetramin ground into or partially dissolved in creosote oil, say about thirty-six pounds of oil, and also, if desired, a small amount of fats, fatty acids, or waxes, preferably three to six per cent. by weight; and finally cool the potentially reactive resin (now containing both free cresol and free hexamethylenetetramin) in pans; and break up or comminute the material, say to pass through a 60-mesh screen, or finer.

Having in this manner produced an anhydrous potentially reactive resin which is capable of anhydrous reaction, mix the same with the previously prepared asbestos, that is, the asbestos mixed with hexamethylenetetramin disssolved in cresol, as described above. This mixing operation may be performed in a dough-mixer, which results in warming the mass. Additional creosote oil, in small quantity, may be added, if necessary, to get the proper consistency and plasticity, the mass being now somewhat in the condition of a putty. The material is then cooled, and broken up or pulverized, say to pass a 10-mesh screen; and in this condition the material is ready for molding.

In the example of a molding compound produced as described above, it is to be noted that of the total binder used in the compound at least substantially one-half (in the illustration given, more than one-half) of the binder comprises a free or unreacted phenolic body and a free methylene body. It is desirable that a minor portion, or not substantially more than one-half, of the binder should be in the form of a phenolic condensation product, as otherwise the most perfect welding or coalescence of the particles of the molding compound will not be obtained in a quick-molding operation. Obviously, the proportions may be varied without departure from the invention.

The molding of the materials is preferably accomplished in the manner described above. That is to say, the material is introduced into the mold and subjected to applied pressure, preferably of several thousand pounds per square inch. This operation being quickly performed, either in cold molds or molds heated in such manner as will not interfere with the quick-molding operation; and the molded articles are then subjected to heat treatment to render them hard, resistant, and tenacious.

If desired, the molding material may be rolled into sheets, and these sheets may be warmed on a steam-table preparatory to balling the material and introducing it into the mold, in accordance with a well-known method of molding plastic sheet material. However, this step is unnecessary; and usually it is undesirable.

The proportions used in compounding the materials to make the fusible, soluble resin are such as to afford about ten phenolic groups to six methylene groups; and, after the blowing process, the proportions are preferably about nine phenolic groups to six methylene groups. The latter corresponds with one mol. of hexamethylenetetramin to nine mols. of the phenolic body. The proportions may be varied somewhat, but it is desirable, in the final product, to have the proportions such as to afford about one phenolic group to each methylene group. Thus, where hexamethylenetetramin is used, the final product corresponds to somewhere between 5.5 mols. of the phenolic body to 6.5 mols. of the phenolic body to each mol. of hexamethylenetetramin. Preferably, the final compound corresponds with about 6.3 mols. of the phenolic body to each mol. of the hexamethylenetetramin, or slightly greater than the molecular ratio. Where the molded article can be subjected economically to a prolonged heat treatment, it is desirable to have a slight excess of phenol rather than an excess of hexamethylenetetramin at the beginning of the heat treatment.

The creosote oil employed is a commercial creosote oil. It is a hydrocarbon solvent of high boiling point, obtained by distillation of coal tars, asphalts, etc., and comprises cyclic hydrocarbons mainly. Such a slowly volatile solvent is useful in giving to the fusible resin a desirable spreading and penetrating quality, and results in an improved product of increased tensile strength. The creosote oil remains partly in the product, desirably tempering the product. Any suitable solvent having these characteristics may be employed. The boiling points of solvents obtained by distillation of coal tars, etc., may vary from about 130° C. to about 235° C. Such a solvent is useful in keeping the molding materials in condition for molding for a considerable period of time after they have been produced.

As has been pointed out, the fusible phenolic condensation product described above is anhydrous in character; and when mixed with hexamethylenetetramin is capable of hardening by an anhydrous reaction, with the evolution of ammonia.

A less desirable method of producing a soluble phenolic condensation product which may be used in the practice of the improved process herein described, is to mix a phenolic body and formaldehyde (40% solution) and a catalytic agent, if desired, using about 1⅔ phenolic groups to each methylene group; boil the mixture until the methylene has combined with the phenolic body; eliminate the water by drawing off, or by boiling, or by both; blow off a sufficient amount of the phenolic body to give a resin corresponding to about 1½ phenolic groups to each methylene group; and having, in this manner, obtained a substantially anhydrous fusible phenolic condensation product, proceed as above by mixing creosote oil and hexamethylenetetramin with the resin, the hexamethylenetetramin being in sufficient quantity to afford, in the final product, about one phenolic group to each methylene group. It will be seen that this method affords a substitute for the soluble anhydrous resin procured by reacting directly upon a phenolic body with a methylene-amin body in the manner described above.

Another variation of the process, which eliminates the preparatory forming of a phenolic condensation product, is as follows:

Take 75 pounds of hexamethylenetetramin dissolved in 300 pounds of cresol; mix the same with 600 pounds of asbestos pulp and 150 pounds of asbestos fiber, this operation preferably being performed in a kneading machine; proceed with the kneading operation until a thoroughly homogeneous mass is produced. This material may be molded without the addition of an initial condensation product. Such a mixture molds readily and forms easily to the required shape. It has not, however, the stiff plasticity which allows it to maintain its form and at the same time be removed easily from the mold, especially in more complex forms. The desired stiffness and coherency can be produced, however, by the addition of small amounts of suitable resins dissolved in suitable solvents. For example, asphalt or coal tar pitch may be dissolved in benzol and added to the mixture. The proportion of such resins employed may vary. In the case of asphalt, one may advantageously use 10% of the weight of cresol. Other natural resins, such as copal, kauri, etc., may be used in suitable proportions to give the desired consistency to the plastic. In any case, a percentage of creosote oil, or similar material may be added if desired. The materials may be molded at ordinary temperatures under pressure, or in moderately heated molds; and the molded product may be converted to a hard resistant body by suitable prolonged heat treatment. A good example of proportions is 75% of asbestos filler, 20% of a binder composed of a mixture of hexamethylenetetramin and a phenolic body, and 5% of coal tar pitch, these proportions being by weight.

Instead of producing a fusible phenolic condensation product in the manner first described herein, we may proceed in the manner described in United States Letters Patent No. 1,242,593, granted Oct. 9, 1917, using initially about nine mols. of cresol to each mol. of hexamethylenetetramin, and mixing creosote oil with these materials initially or after the reaction has been effected. Such fusible phenolic condensation product may be mixed with hexamethylenetetramin and subsequently mixed with the filler, proceeding in the manner suggested above.

Any suitable fillers may be used in the molding compound, such as asbestos, mica, flock, wood pulp, etc.; and the physical condition of the molding material may vary greatly, depending upon the articles to be produced, and the precise methods which it is preferred to follow in the molding and curing operations. It should be noted, also, that the use of a slowly-volatile solvent, or a solvent having a high boiling point, imparts to the molding compound a characteristic which prevents injury to the dies in the molding operation. In other words, this molding compound can be used without wearing off the sharp edges or corners of the dies, so that sharp outlines in the molded product may be secured for an indefinite time, and for a very large number of operations without renewing the dies. This is a very important consideration, and the result is doubtless due to the fact that the great body of the molding compound retains the solvent, even after there has been an apparent surface evaporation from the particles, or pellets, which make up the compound, so that the compound retains perfect plasticity and will not cut the dies, even though the molding operation be not performed for a considerable time after the compound has been prepared. Were a readily volatile solvent, such as alcohol, acetone, or the like, to be employed, the result would be not only that the molding compound would not possess the necessary degree of plasticity to enable it to flow properly and weld properly in the dies, but, also, the compound would cause the dies to wear out rapidly in the molding operation.

As hereinbefore stated, phenol, or a homologue, or any suitable phenolic body, may be employed in practising the process. Recognized equivalent phenolic bodies in the art are, for example, phenol, the cresols, and the xylenols. The most desirable active methylene body for use in the process is the methylene-amin compound hexamethylenetetramin. Another instance of a methylene-amin compound which might be used in the process is hydrobenzamid or benzaldehyde amin. It may be stated, however, that this latter substance is too expensive at the present time to be economically employed in the process.

The foregoing detailed description has been given for clearness of understanding only, and no unnecessary limitations should be understood therefrom, but the appended claims should be construed as broadly as permissible, in view of the prior art.

What we regard as new and desire to secure by Letters Patent is:—

1. The process of producing a phenolic condensation product article, which comprises: mixing initially a fibrous filler and raw materials for a binder comprising a phenolic body in unreacted state; adding and mixing therewith a fusible phenolic condensation product, the mixture being supplied with an anhydrously reacting methylene body in sufficient quantity to convert the binder to a hard and substantially infusible state; molding the materials thus compounded under heavy pressure at ordinary or moderate temperature for a relatively short period of time; and then subjecting the molded article to heat treatment after removal from the mold until it becomes hard, resistant and substantially infusible.

2. The process of producing a molded phenolic condensation product article, which comprises: mixing a fibrous filler and a binder comprising a fusible phenolic condensation product, a phenolic body and a methylene substance adapted to re-act anhydrously, said binder materials being proportioned to form a hard and substantially infusible condensation product and at least approximately half the binder comprising a free phenolic body and free methylene substance; molding the materials thus compounded under pressure at ordinary or desired temperature for a relatively short period of time; and then subjecting the molded article, after removal from the mold, to prolonged heat treatment until a hard and substantially infusible body results.

3. The process of producing a molded phenolic condensation product article, which comprises: mixing a fibrous filler and a binder comprising a fused substantially anhydrous phenolic condensation product, a phenolic body and a methylene-amin substance adapted to react anhydrously, said binder materials being proportioned to react to form a hard and substantially infusible condensation product and a large portion of the binder comprising a free phenolic body and free methylene substance adapted to react anhydrously therewith; compacting the materials and forming a body without substantially hardening the same; and subjecting such body to prolonged heat treatment until the binder is converted to a hard, resistant and substantially infusible state.

4. The process of producing a molded phenolic condensation product article, which comprises: mixing initially a filler and a phenolic body and a methylene body which is capable of acting anhydrously with said phenolic body to form a condensation product; adding and mixing therewith a phenolic condensation product, the phenolic condensation product being taken in greater proportion than said phenolic body, the materials of the binder being taken in proportions adapted to produce a hard and substantially infusible condensation product; subjecting the mass to a quick-molding operation without substantially hardening it; and subjecting the molded article, after removal from the mold, to prolonged heat treatment until a hard, resistant and substantially infusible body results.

5. The process of producing a molded phenolic condensation product article, which comprises: mixing initially a filler and a phenolic body and hexamethylenetetramin; adding and mixing therewith a substantially anhydrous phenolic condensation product containing free phenol, the binder containing also a sufficient amount of hexamethylenetetramin to convert the binder to a hard and substantially infusible state; subjecting the materials thus compounded to a quick-molding operation under pressure without substantially hardening the same; and then subjecting the molded body to heat treatment out of the mold until the binder is converted to a hard, resistant and substantially infusible state.

6. The process of producing a phenolic condensation product, which comprises: mixing a fibrous filler, a binder comprising a fused phenolic condensation product, a phenolic body and a methylene-amin substance adapted to combine anhydrously therewith, and a solvent for the binder having a high boiling point, said binder materials being proportioned to react to form a hard and substantially infusible condensation product and at least approximately one-half of the binder comprising a free phenolic body and a free methylene substance; compacting said materials into a body without substantially hardening the same; and subjecting such body to prolonged heat treatment until it becomes hard, resistant and substantially infusible.

7. The process of producing a phenolic condensation product, which comprises: mixing a fibrous filler, a binder comprising a fused phenolic condensation product, a phenolic body and a methylene-amin substance adapted to combine anhydrously therewith, and a solvent for the binder comprising cyclic hydrocarbons and containing no readily reactive group, said binder materials being proportioned to react to form a hard and substantially infusible condensation product and at least approximately one-half of the binder comprising a free phenolic body and a free methylene substance; compacting said materials into a body without substantially hardening the same; and subjecting such body to prolonged heat treatment until it becomes hard, resistant and substantially infusible.

8. The process of producing a phenolic condensation product article, which comprises: mixing together initially a filler, a phenolic body and a methylene-amin body adapted to re-act anhydrously therewith; adding and mixing therewith a fusible phenolic condensation product and including in the mixture a sufficient amount of methylene-amin substance to complete the conversion to a hard, resistant product; and subjecting the materials thus compounded to molding and heat treatment to produce a hard, resistant body.

9. The process of producing a molded phenolic condensation product article, which comprises: mixing together a filler, a phenolic body and hexamethylenetetramin; adding and mixing therewith a substantially anhydrous fusible phenolic condensation product containing a large excess of phenolic body and including in the mixture a sufficient amount of hexamethylenetetramin to convert the product to a hard, resistant state and including in the mixture also a relatively small quantity of a hydrocarbon solvent of high boiling point; subjecting the material thus compounded to a quick-molding operation under heavy pressure; and subjecting the molded article, after removal from the mold, to prolonged heat treatment to produce a hard, resistant and substantially infusible body.

10. The process of producing a phenolic condensation product, which comprises: mixing together a filler and a binder comprising a fused substantially anhydrous phenolic condensation product having incorporated therein a large excess of phenolic body, a hydrocarbon solvent of comparatively high boiling point and a methylene-amin substance adapted to combine with the fused condensation product by an anhydrous reaction, the materials of said binder being proportioned to give ultimately a hard and substantially infusible product and the free phenolic body and free methylene-amin substance constituting at least approximately one-half the binder; subjecting the materials thus compounded to a quick molding operation at high pressure; and converting the molded product, after removal from the mold, to a hard, resistant and substantially infusible body by prolonged heat treatment.

11. The process of producing a molded phenolic condensation product article, which comprises: mixing together a filler and a binder comprising a fused, substantially anhydrous phenolic condensation product containing a large excess of phenol, and hexamethylenetetramin in sufficient quantity to combine with the fused condensation product and give a hard and substantially infusible product; subjecting the materials thus compounded to a quick-molding operation at high pressure without substantial hardening; and converting the molded product, after removal from the mold, to a hard, resistant and substantially infusible state by prolonged heat treatment.

12. The process of producing a phenolic condensation product, which comprises: mixing together a filler and a binder comprising a fused substantially anhydrous phenolic condensation product having incorporated therein a large excess of phenolic body, a hydrocarbon solvent of comparatively high boiling point and a methyleneamin substance adapted to combine with the fused condensation product by an anhydrous reaction, the materials of said binder being proportioned to give ultimately a hard and substantially infusible product; subjecting the materials thus compounded to a quick-molding operation at high pressure; and converting the molded product, after removal from the mold, to a hard, resistant and substantially infusible body by prolonged heat treatment.

LAWRENCE V. REDMAN.
ARCHIE J. WEITH.
FRANK P. BROCK.